United States Patent [19]

Masaike

[11] Patent Number: 5,153,725
[45] Date of Patent: Oct. 6, 1992

[54] AUTOMATIC FREQUENCY CONTROL CIRCUIT

[75] Inventor: Yasufumi Masaike, Kanagawa, Japan

[73] Assignee: NEC Corporation, Tokyo, Japan

[21] Appl. No.: 789,072

[22] Filed: Oct. 7, 1991

[30] Foreign Application Priority Data

Oct. 11, 1990 [JP] Japan .................. 2-272767

[51] Int. Cl.$^5$ .............................................. H04N 5/10
[52] U.S. Cl. .................................. 358/153; 358/158
[58] Field of Search ............... 358/153, 152, 154, 148, 358/158, 159

[56] References Cited

U.S. PATENT DOCUMENTS

| 4,317,133 | 2/1982 | Fernsler et al. | 358/158 |
| 4,631,587 | 12/1986 | Turner | 358/148 |
| 4,661,798 | 4/1987 | Ohtsu | 358/152 |

FOREIGN PATENT DOCUMENTS

| 0201469 | 11/1983 | Japan | 358/153 |
| 0074465 | 4/1986 | Japan | 358/153 |
| 0229564 | 9/1989 | Japan | 358/153 |

Primary Examiner—James J. Groody
Assistant Examiner—David E. Harvey

[57] ABSTRACT

An automatic frequency control circuit includes a phase comparator, a voltage-controlled oscillator, a frequency divider, a decoder, and a discriminating circuit. The phase comparator compares a phase of an input signal of a horizontal sync signal for television with a phase of a signal phase-locked with the horizontal sync signal to generate a control voltage. The VCO outputs a VCO signal having a frequency controlled by the control voltage. The frequency divider divides a frequency of the VCO signal and outputs an intermediate frequency division ratio signal and the phase-locked signal serving as a terminal frequency division ratio output. A decoder logically processes the phase-locked signal, the intermediate frequency division ratio signal, and the VCO signal and outputs a horizontal sync signal phase-locked with the horizontal sync signal. A discriminating circuit triggered at a leading edge of a vertical sync signal for television latches the phase-locked signal and generates an even/odd field discrimination output.

6 Claims, 6 Drawing Sheets

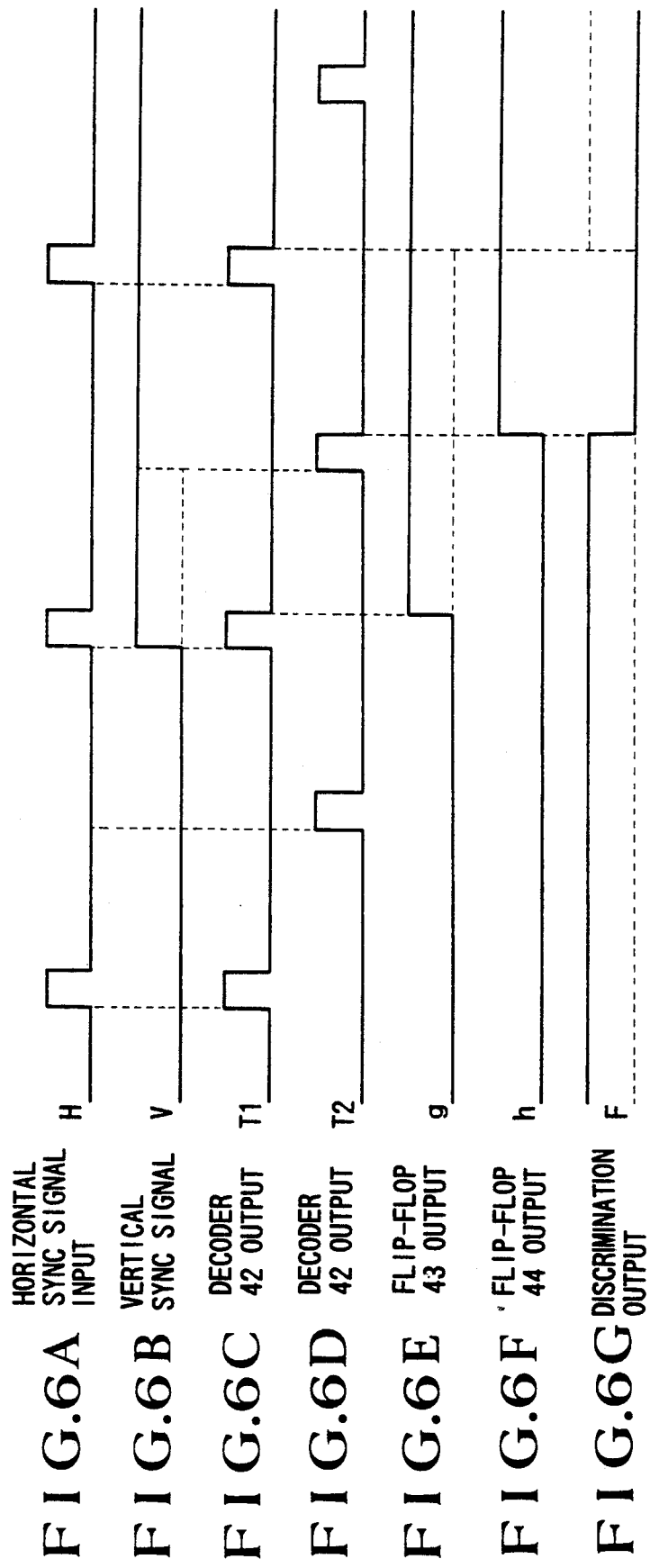

AUTOMATIC FREQUENCY CONTROL CIRCUIT

BACKGROUND OF THE INVENTION

The present invention relates to an automatic frequency control circuit and, more particularly, to an automatic frequency control circuit of a horizontal sync signal for television or the like.

In a conventional technique, an automatic frequency control circuit for a horizontal sync signal of a television signal and an even/odd filed discriminating circuit in a scanning frame are respectively constituted by independent circuits.

In a conventional automatic frequency control circuit 3, as shown in FIG. 3, a phase-locked loop (PLL) phase-locked to a horizontal sync signal input IH is constituted by a phase comparator 31, a low-pass filter (LPF) 32, and a voltage-controlled oscillator (VCO) 33 having the same frequency as a horizontal sync signal frequency.

An operation of a conventional automatic frequency control circuit will be described below.

FIGS. 4A to 4E are timing charts showing the operation of the conventional automatic frequency control circuit 3.

An output x (FIG. 4B) from the VCO 33 locked to the horizontal input signal IH (FIG. 4A) is delayed by a delay circuit 34 constituted by a resistor and a capacitor to obtain a signal e (FIG. 4C), and the signal e is inverted by an inverter 35 to generate a delayed signal f (FIG. 4D). The logical NOR between the delayed signal f and the output x from the voltage-controlled oscillator 33 is calculated by an NAND gate 36 so as to generate a horizontal sync signal output OH (FIG. 4E).

As described above, when noise is mixed in an input signal in a weak electric field or the like or a signal is omitted, this signal is corrected to output a stable signal.

A conventional even/odd field discriminating circuit 4, as shown in FIG. 5, is constituted by a counter 41, a decoder 42, flip-flops 43 and 44, and a discriminator 45.

An operation of the conventional even/odd field discriminating circuit 4 will be described below.

FIGS. 6A to 6G are timing charts showing the operation of the circuit shown in FIG. 5.

In this circuit, two input timing signals for a vertical sync signal V (FIG. 6B) are generated by a counter 41 for counting the number of clocks CK from the ON timing of a horizontal sync signal output H, an output from a decoder 42 for the count value, a timing T1 (FIG. 6C) phase-locked to the horizontal sync signal (FIG. 6A), and a timing T2 (FIG. 6D) shifted by a half period of the timing T1.

A phase relationship between the horizontal sync signal H and the vertical sync signal V is determined by the discriminator 45 in an order of vertical timing signals g and h (FIGS. 6E and 6F) derived from the vertical sync signal V latched by the flip-flops 43 and 44 at the timings T1 and T2, and the discriminator 45 outputs a discrimination output (FIG. 6G) for determining whether a field generated by the vertical sync signal is an even field or an odd field.

For example, when a scanning field is an even field, a phase relationship between the horizontal sync signal H and the vertical sync signal V becomes a relationship represented by a solid line in FIG. 6B, and the vertical sync signal V is input in an order of the timings T1 and T2. Therefore, the vertical timing signals g and h are output in an order named.

In contrast to this, when a scanning field is an odd field, a relationship between the horizontal sync signal H and the vertical sync signal V becomes a relationship represented by a dotted line in FIG. 6B, and the vertical sync signal V is input in an order of the timings T2 and T1. Therefore, the vertical timing signals h and g are output in an order named.

The discriminator 45 determines the value of a discrimination output F in an order of the vertical timing signals g and h.

Since the above conventional automatic frequency control circuit is independent of an even/odd field discriminating circuit in a scanning frame, high-precision clocks for generating timing signals for supplying a vertical sync signal to the even/odd field discriminating circuit, a counter for counting the number of clocks, and a decoder for extracting the timing signals from the count value of the counter are disadvantageously required.

The automatic frequency control circuit requires a delay circuit, constituted by a resistor and a capacitor, for generating a horizontal sync signal output having a duty ratio of about 7.4% from an output having a duty ratio of 50% from the VCO of the PLL. However, when the resistor and capacitor are incorporated in a semiconductor integrated circuit, the duty ratio is disadvantageously changed due to a large area occupied by the resistor and capacitor, a change in power source voltage, and ununiformity of elements.

SUMMARY OF THE INVENTION

It is an object of the present invention to provide an automatic frequency control circuit from which a large number of circuit elements can be omitted.

It is another object of the present invention to provide an automatic frequency control circuit capable of considerably decreasing an occupying area thereof when the automatic frequency control circuit is incorporated in a semiconductor integrated circuit.

It is still another object of the present invention to provide an automatic frequency control circuit for preventing a change in duty ratio caused by ununiformity of a power source voltage and elements.

In order to achieve the above objects of the present invention, there is provided an automatic frequency control circuit comprising, a phase comparator for comparing a phase of an input signal of a horizontal sync signal for television with a phase of a signal phase-locked with the horizontal sync signal to generate a control voltage, a voltage-controlled oscillator for outputting a voltage-controlled oscillator signal having a frequency controlled by the control voltage, a frequency divider for dividing a frequency of the voltage-controlled oscillator signal and outputting an intermediate frequency division ratio signal and the phase-locked signal serving as a final frequency division ratio output, a decoder for logically processing the phase-locked signal, the intermediate frequency division ratio signal, and the voltage-controlled oscillator signal and outputting a horizontal sync signal phase-locked with the horizontal sync signal, and a discriminator, triggered at a leading edge of a vertical sync signal for television, for latching the phase-locked signal and generating an even/odd field discrimination output.

BRIEF DESCRIPTION OF THE DRAWINGS

FIGS. 6A to 6G are timing charts showing an operation of the circuit shown in FIG. 5.

DESCRIPTION OF THE PREFERRED EMBODIMENT

An embodiment of the present invention will be described below with reference to the accompanying drawings.

Figure 1:
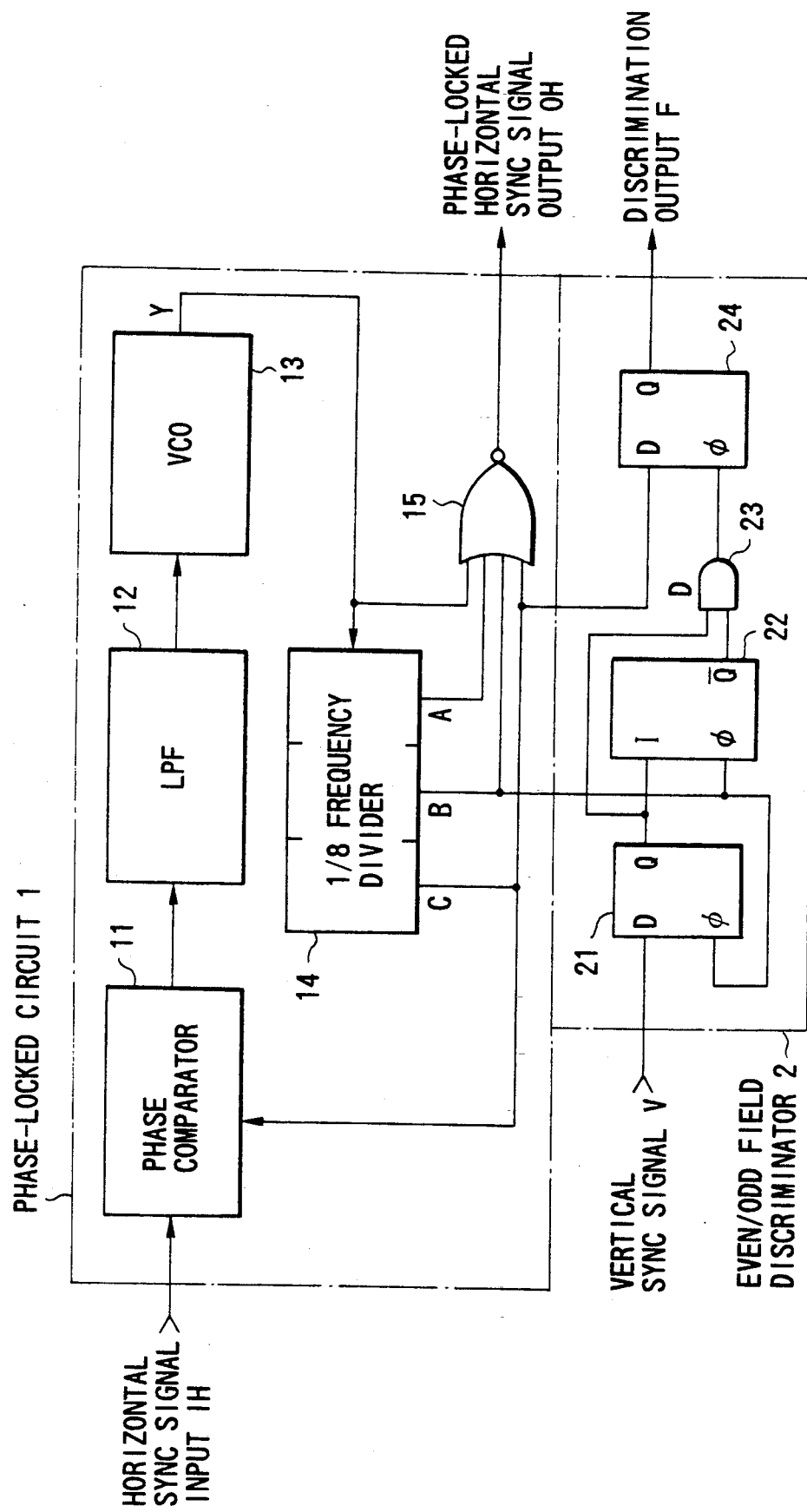
FIG. 1 is a block diagram showing a circuit according to an embodiment of the present invention.

FIG. 1 shows the embodiment of the present invention.

As shown in FIG. 1, an automatic frequency control circuit of the present invention is constituted by a phase-locked circuit 1 and an even/odd field discriminating circuit 2.

The phase-locked circuit 1 is constituted by a phase comparator 11, a low-pass filter (LPF) 12, a voltage-controlled oscillator (VCO) 13, an $\frac{1}{8}$ frequency divider 14, and a NOR circuit 15.

The VCO 13 oscillates at a frequency eight times a horizontal sync signal frequency and outputs a VCO signal Y.

The $\frac{1}{8}$ frequency divider 14 divides the frequency of the VCO signal Y to output intermediate $\frac{1}{2}$- and $\frac{1}{4}$-frequency division ratio signals A and B and an $\frac{1}{8}$-frequency phase-locked signal C.

The NOR circuit 15 is a decoder for calculating the logical NOR between the VCO signal Y, the intermediate frequency division ratio signals A and B, and the phase-locked signal C to output a phase-locked horizontal sync signal OH.

The even/odd field discriminating circuit 2 is constituted by flip-flops 21, 22, and 24 and an AND circuit 23.

An operation of this embodiment will be described below.

FIGS. 2A to 2I are timing charts of the circuit of the embodiment shown in FIG. 1.

While a horizontal sync signal input IH is kept at "H" level, the phase-locked circuit 1 compares the phase of the horizontal sync signal input IH with the phase of the phase-locked signal C serving as an $\frac{1}{8}$ frequency output from the frequency divider 14 so as to generate a control voltage.

The control voltage is input to the VCO 13 through the low-pass filter 12 to control an oscillation frequency of the VCO 13.

Figure 2:
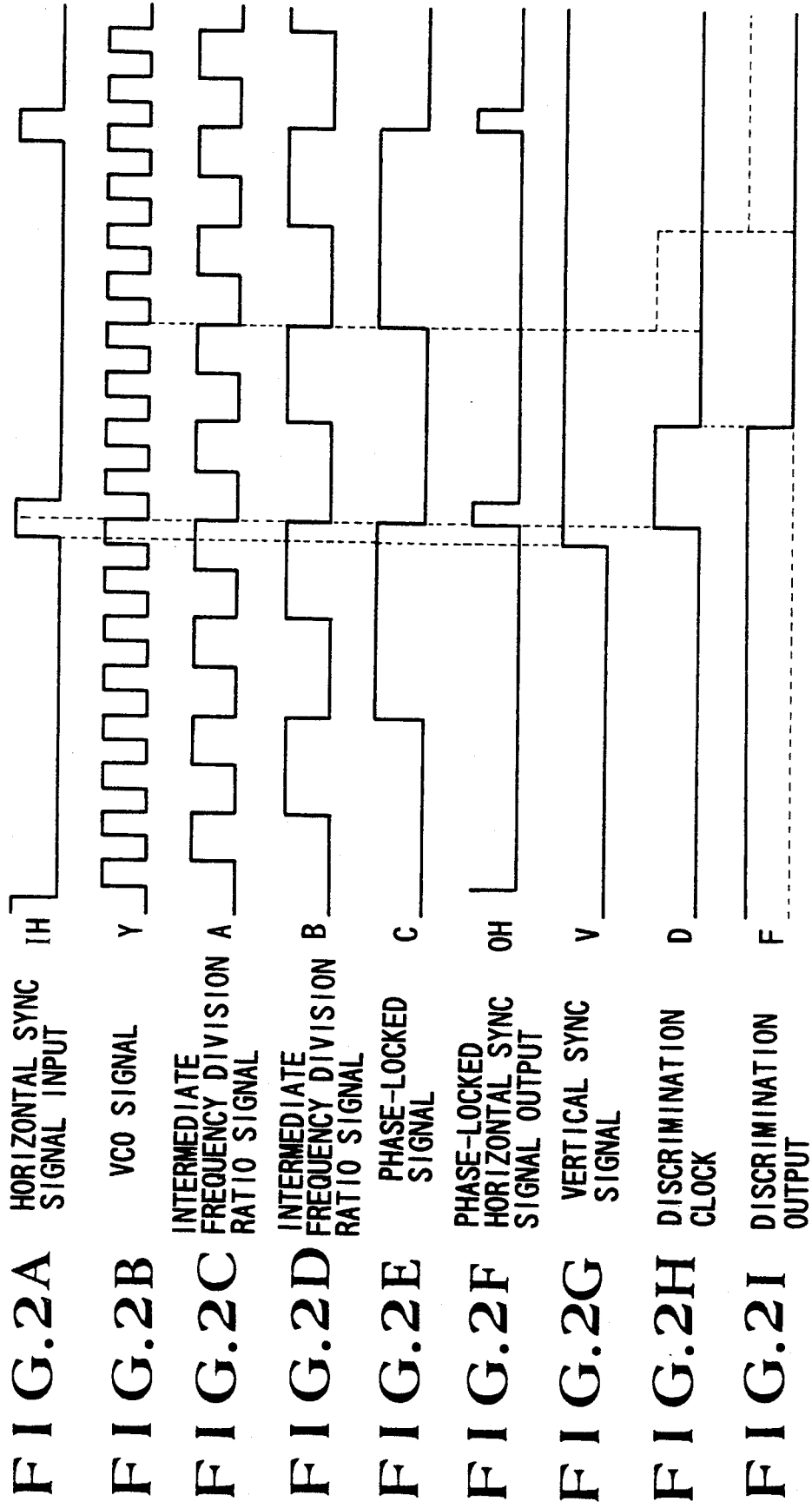
FIGS. 2A to 2I are timing charts showing an operation of the circuit shown in FIG. 1.
Figure 3:
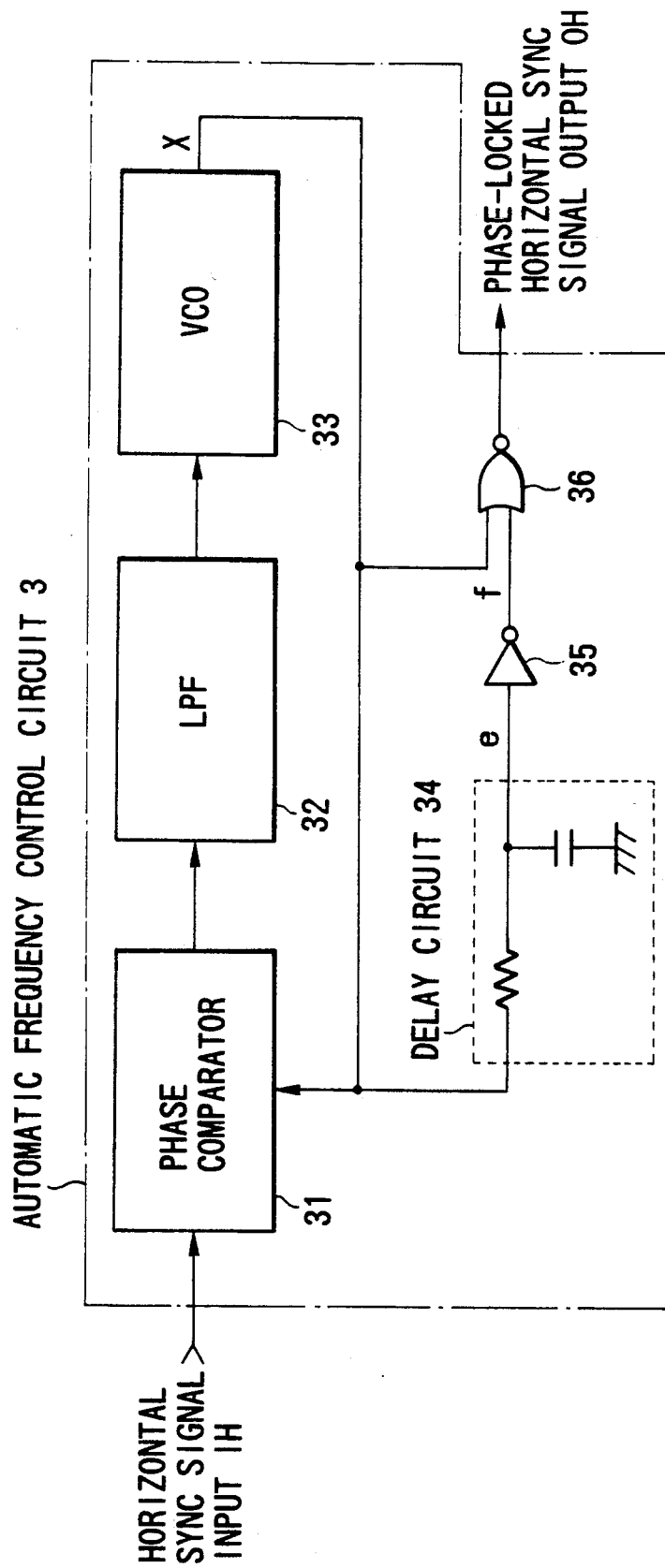
FIG. 3 is a block diagram showing a conventional automatic frequency control circuit.
Figure 4:
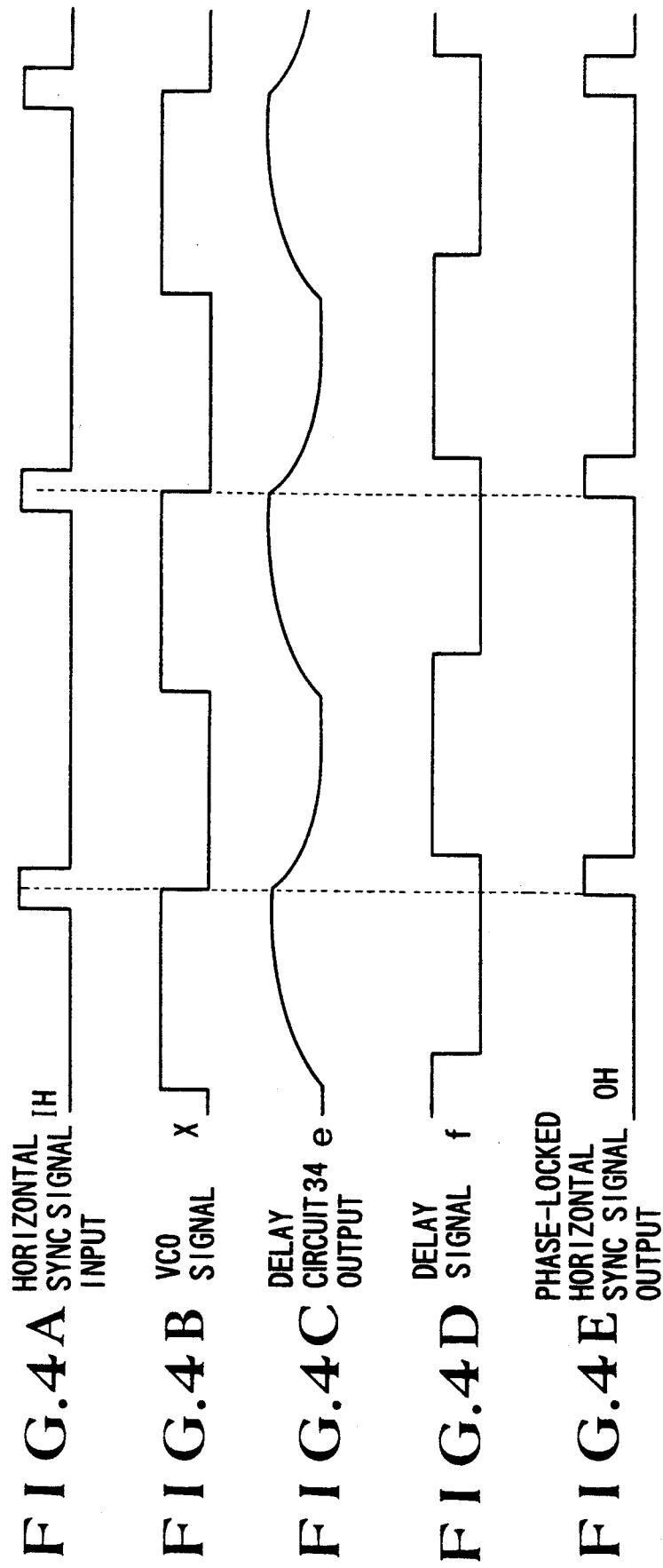
FIGS. 4A to 4E are timing charts showing an operation of the circuit shown in FIG. 3.
Figure 5:
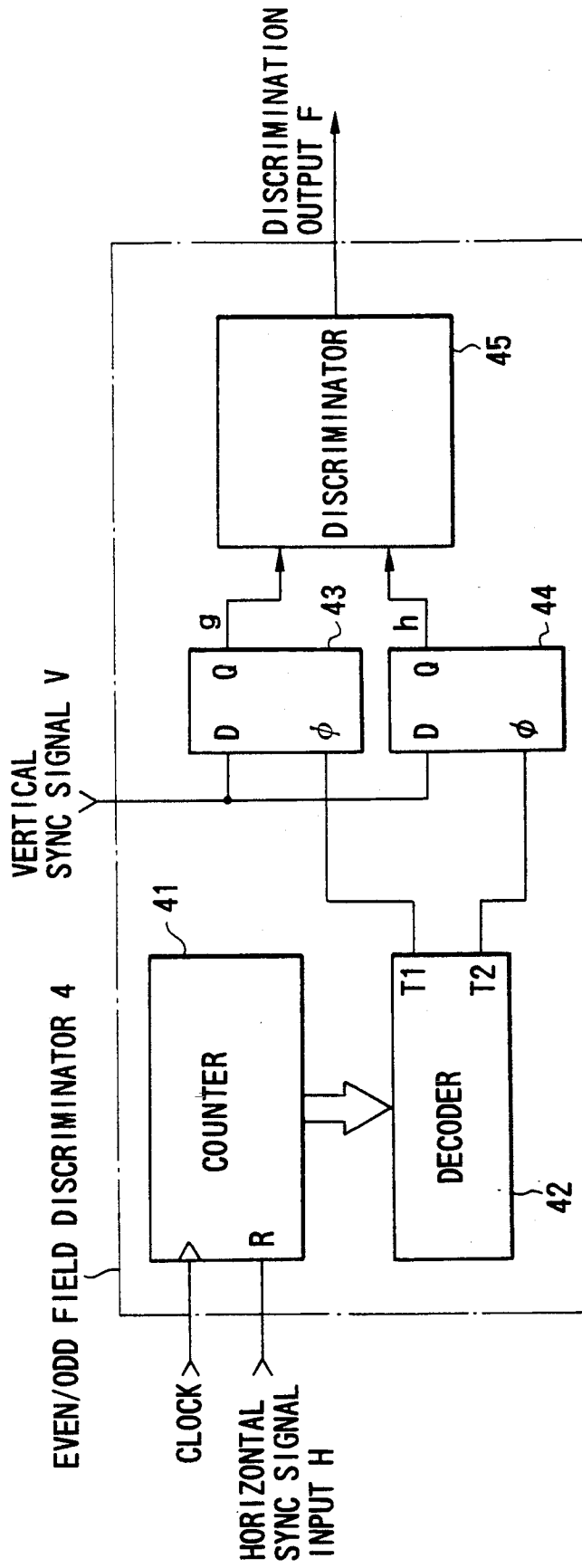
FIG. 5 is a block diagram showing a conventional even/odd field discriminating circuit.

If the oscillation frequency is proportional to the control voltage, as shown in FIG. 2E, the VCO 13 is locked at a center timing during a period of setting the horizontal sync signal input IH (FIG. 2A) at "H"-level so as to correspond to the trailing edge of the phase-locked signal C.

The voltage-controlled oscillator signal Y shown in FIG. 2B, the intermediate $\frac{1}{2}$- and $\frac{1}{4}$-frequency division ratio signals A and B shown in FIGS. 2C and 2D and serving as outputs from the $\frac{1}{8}$ frequency divider 14, and the $\frac{1}{8}$-frequency phase-locked signal C shown in FIG. 2E are input to the NOR circuit 15, and the logical NOR therebetween is calculated. The output becomes the phase-locked horizontal sync signal OH (FIG. 2F) having a pulse width of about 4 $\mu$S and phase-locked with a horizontal sync signal input IH input from an external circuit.

The phase-locked horizontal signal OH is output as a stable sync signal, even when the horizontal sync signal input IH input from an external circuit is degraded due to noise mixing or a signal omission.

A phase relationship between the horizontal sync signal IH and a vertical sync signal V will be described below. That is, as shown in FIG. 2G, the timing of the leading edge of the vertical sync signal V corresponds to the timing of the leading edge of the horizontal sync signal IH in the even field indicated by the solid line, and the timing of the leading edge of the vertical sync signal V corresponds to the intermediate timing of the period of the horizontal sync signal IH in the odd field indicated by the dotted line.

The leading edge of the vertical sync signal V is extracted using the intermediate $\frac{1}{4}$-frequency division ratio signal B from the $\frac{1}{8}$ frequency divider 14 as a clock by the flip-flops 21 and 22. Thereafter, a discrimination clock D which is the logical AND between the leading edge of the extracted vertical sync signal V and the leading edge of the $\frac{1}{4}$-frequency division ratio signal B shown in FIG. 2H is generated from the AND circuit 23. That is, a discrimination clock generator is constituted by the flip-flops 21 and 22 and the AND circuit 23. In this case, the AND circuit 23 latches the vertical sync signal V indicated by the solid line of FIG. 2G to generate the discrimination clock D indicated by the solid line of FIG. 2H in the even field, and the AND circuit 23 latches the vertical sync signal V indicated by the dotted line of FIG. 2G to generate the discrimination clock D indicated by the dotted line of FIG. 2H in the odd field.

When the $\frac{1}{8}$-frequency phase-locked signal C is latched by the flip-flop 24 at a timing of the discrimination clock D, as shown in FIG. 2I, a discrimination output F goes to "L" level indicated by the solid line in the even field, and the discrimination output F goes to "H" level indicated by the dotted line in the odd field. Therefore, discrimination of the even and odd fields can be easily performed.

The embodiment of the present invention is described above. The present invention is not limited to the above embodiment, and various modifications of the present invention can be effected.

For example, although an $\frac{1}{8}$ frequency divider is used as a frequency divider, the frequency division ratio is not limited to 8, a division ratio capable of obtaining the pulse width of a phase-locked horizontal sync signal which is a value of about 4.7 $\mu$S can be applied as the frequency division ratio of the frequency divider without departing from the spirit and scope of the present invention.

As described above, according to the present invention, since the automatic frequency control circuit includes an even/odd field discrimination function in a scanning frame, a high-precision clock for generating timing signals, a counter for counting the number of the timing signals, and a decoder for extracting timing signals from the count value of the counter are not required. Therefore, the number of elements can be considerably decreased.

A VCO of a PLL oscillates an output having a frequency higher than that of a horizontal sync signal, and a phase-locked horizontal sync signal having a low duty ratio is directly derived from the output. Therefore, a delay circuit constituted by a resistor and a capacitor is not required.

Therefore, when the automatic frequency control circuit is incorporated in a semiconductor integrated circuit, an area for the automatic frequency control circuit can be considerably decreased. In addition, a change in duty ratio caused by a change in power source voltage and ununiformity of elements can be prevented.

What is claimed is:

1. An automatic frequency control circuit comprising:
   a phase comparator (11) for comparing a phase of an input signal (IH) of a horizontal sync signal for television with a phase of a signal (C) phase-locked with the horizontal sync signal to generate a control voltage;
   a voltage-controlled oscillator (13) for outputting a voltage-controlled oscillator signal (Y) having a frequency controlled by the control voltage;
   a frequency divider (14) for dividing a frequency of the voltage-controlled oscillator signal and outputting an intermediate frequency division ratio signal (A, B) and the phase-locked signal serving as a final frequency division ratio output;
   a decoder (15) for logically processing the phase-locked signal, the intermediate frequency division ratio signal, and the voltage-controlled oscillator signal and outputting a horizontal sync signal phase-locked with the horizontal sync signal; and
   a discriminating circuit (2), triggered at a leading edge of a vertical sync signal (V) for television, for latching the phase-locked signal and generating an even/odd field discrimination output (F).

2. A circuit according to claim 1, wherein said phase comparator, said voltage-controlled oscillator, and the frequency divider constitute a phase-locked loop.

3. A circuit according to claim 1, wherein said frequency divider is an $\frac{1}{8}$ frequency divider for outputting intermediate $\frac{1}{2}$- and $\frac{1}{4}$-frequency division ratio signals.

4. A circuit according to claim 1, wherein said decoder is constituted by a NOR circuit (15) for calculating a logical NOR between the phase-locked signal, the intermediate frequency division ratio signal, and the voltage-controlled oscillator signal.

5. A circuit according to claim 1, wherein said discriminating circuit is constituted by a discrimination clock generator (21, 22, 23) for generating a discrimination clock at a leading edge of the vertical sync signal using the intermediate frequency division ratio signal and a latch circuit (24) for latching the phase-locked signal in response to the discrimination clock.

6. A circuit according to claim 5, wherein said discrimination clock generator is constituted by a first flip-flop (21) for reading the vertical sync signal by the intermediate frequency division ratio signal, a second flip-flop (22) for reading a set output of said first flip-flop in response to the intermediate frequency division ratio signal, and an AND circuit (23) for calculating a logical AND between the set output of said first flip-flop and a non-set output of said second flip-flop.

* * * * *